United States Patent [19]

Roth

[11] 4,276,902

[45] Jul. 7, 1981

[54] MODULAR FLUID PRESSURE REGULATOR VALVES

[75] Inventor: Verlon C. Roth, Pasadena, Calif.

[73] Assignee: RK Industries, Ontario, Calif.

[21] Appl. No.: 90,907

[22] Filed: Nov. 5, 1979

[51] Int. Cl.³ .................................... F16K 31/12
[52] U.S. Cl. ..................... 137/505.18; 137/505.29; 137/505.41; 137/505.42; 251/DIG. 1
[58] Field of Search ............. 137/505.18, 505.41, 137/505.42, 505.26, 505.29, 505.34, 505.35; 251/DIG. 1

[56] References Cited

U.S. PATENT DOCUMENTS

| | | | |
|---|---|---|---|
| 2,335,935 | 12/1943 | Hanley | 137/505.29 X |
| 2,552,053 | 5/1951 | Miller | 251/DIG. 1 |
| 2,660,834 | 12/1953 | MacGlashan | 137/505.39 |
| 2,971,090 | 2/1961 | Piet | 251/DIG. 1 |
| 2,982,294 | 5/1961 | Koutnik | 137/505.42 X |
| 3,064,670 | 11/1962 | Peras | 137/505.18 X |
| 3,181,561 | 5/1965 | Schaller | 137/505.18 |
| 3,731,905 | 5/1973 | Piet | 251/DIG. 1 X |
| 3,791,412 | 2/1974 | Mays | 137/505.42 |

FOREIGN PATENT DOCUMENTS 930657  7/1963  United Kingdom ............... 137/505.42

*Primary Examiner*—Harold W. Weakley

*Attorney, Agent, or Firm*—J. L. Jones, Sr.

[57] ABSTRACT

A fluid pressure regulator valve has a rigid plastic composition valve housing having a coaxial aligned opposed inlet port and outlet port, and a hollow cylindrical interior having four stepped successively larger selected bore diameters on serially proceeding from the bottom deep base bore to the top screw cap retainer bore. A cylindrical sealing solid piston has a first flat piston crown end face and an opposed second flat piston end face, the second end face having a larger diameter than the crown face, and has one diametrically concentric fluid transfer channel disposed in and circumferentially around the piston cylindrical axis adjacent to the first piston face. A cylindrical screw cap has a shaped hollow dome and screw threads secured in the hollow cylindrical valve housing interior. An interior fluid distribution annular washer is secured in an annular washer recess disposed in the interior face of the screw cap. The washer has multiple concentric radial apertures extending normally from the washer symmetry axis, providing a connecting fluid flow path to a concentric tubular cap bore disposed in the screw cap. O-rings disposed in the several O-ring channels provide separation of the pressurized fluid flow from valve actuating means. an O-ring sealing shoulder disposed on the slidable piston adjacent to the fluid transfer channel provides a piston seal against fluid flow.

3 Claims, 6 Drawing Figures

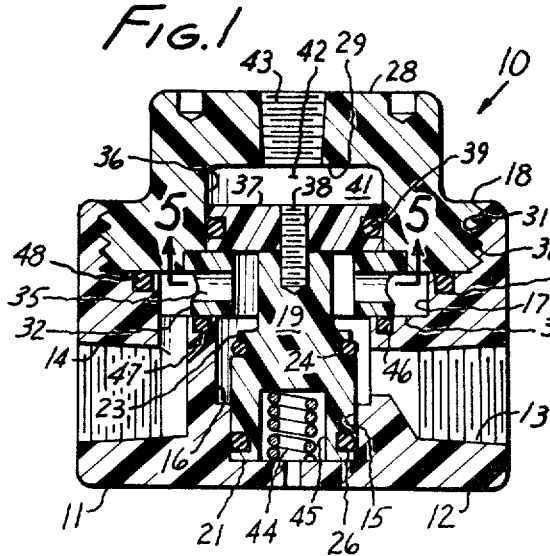

MODULAR FLUID PRESSURE REGULATOR VALVES

CROSS-REFERENCE TO RELATED APPLICATION

Reference is made to the proposed copending U.S. Patent application titled PLURAL MODULAR FLUID TRANSFER VALVES invented by Verlon C. Roth, whose residence is in Azusa, California.

BACKGROUND OF THE INVENTION

The fluid pressure regulator valves of this invention are classified in Class 137 Subclass 505.

These modular fluid pressure regulator valves provide moderate cost, rigid plastic composition valves suitable for controlling the outlet pressure of fluid flow streams in an industrial process or the like. The output fluid pressure of a process fluid stream can be simply regulated from 10–80 psi. The regulator valves have the same basic rigid plastic composition valve housing as taught, disclosed and claimed in the copending patent application of the same inventor as in this patent application.

Boxall discloses and claims a manually adjustable pressure regulator having a pair of resiliently interconnected pistons in U.S. Pat. No. 3,911,947, issued Oct. 14, 1975. One of the interconnected pistons acts directly on a valve member which controls flow of a pressurized fluid. The valve has at least six stacked concentric chambers.

Satoh, in U.S. Pat. No. 3,605,800 issued Sept. 20, 1971, discloses and claims an automatic regulating valve in which the valve body is provided with a neck portion defining upper and lower surfaces receiving the same pressure. Adjusting plate means act on the valve body to maintain a specific pressure.

Umann, in U.S. Pat. No. 3,308,847 issued Mar. 14, 1967, discloses and claims a pressure regulating valve having plural flexible valve diaphragms.

In U.S. Pat. No. 2,731,975 issued Jan. 24, 1956, Boals discloses and claims a fluid pressure reducing valve having a multiplicity of components and at least five concentric cylindrical stacked bores.

SUMMARY OF THE INVENTION

A fluid pressure regulator valve combination has a rigid plastic composition valve housing having a coaxial aligned opposed inlet port and outlet port, and a hollow cylindrical interior having four stepped concentric cylindrical bores. The concentric bores comprise a deep base bore, a fluid transfer bore disposed above the deep base bore, an outlet base bore disposed above the transfer bore, and a screw cap retainer bore having internal screw threads disposed above the outlet base bore. Each one of the stacked concentric bores has a successively larger selected bore diameter on serially proceeding from the deep base bore to the screw cap retainer bore. A cylindrical sealing solid piston has a first flat piston crown end face and an opposed second flat piston end face. The second piston end has a larger diameter than the crown face. The piston has one diametrically concentric fluid transfer channel disposed in and circumferentially around the piston cylindrical axis adjacent to the first piston crown end face, and the piston has a circumferential shoulder suitable for sealing fluid flow disposed adjacent to the channel. Two sealing O-rings are disposed in O-ring sealing channels, each one of the O-rings separately concentrically disposed adjacent to the second flat piston end face and the circumferential shoulder adjacent to the fluid transfer channel, providing slidable fluid sealants on the piston.

A cylindrical screw cap has a shaped hollow dome and external concentric screw threads secured in the hollow cylindrical valve housing interior, the external screw threads mating with the screw threads of the screw cap retainer bore. An interior fluid distribution annular washer is secured and seated between the base of the outlet base bore, a concentric annular washer recess disposed in the interior face of the screw cap, adjacent to the cap screw threads. The annular washer has multiple concentric radial apertures extending normally from the annular washer symmetry axis, providing a connecting fluid flow path to a concentric tubular cap bore disposed in the screw cap. A solid flat slidable sealant piston head is diametrically sized to provide a close slidable linear alignment in the screw cap tubular bore, the flat sealant piston head being coaxially secured by fastener to the first flat crown end face of the solid piston. The solid flat sealant piston head has an O-ring sealant, providing a fluid transfer seal between a lower fluid cavity in the screw cap bore and an upper cavity in the screw cap bore.

A first actuating means is secured in the screw cap adjacent to the solid flat piston head and is disposed to cooperatively variably actuate the solid flat piston head. A second actuating means has a compression loaded metal spring biased in an aperture disposed at the second piston end face. One sealing O-ring is disposed in an O-ring channel concentrically disposed in the base of the outlet base bore adjacent to the fluid transfer bore, providing a fluid transfer seal. One sealing O-ring is disposed in an O-ring channel concentrically disposed in the base of the screw cap retainer bore, providing a fluid transfer seal. A first internal fluid port connects conductively the inlet port to the fluid transfer bore. A second internal fluid port is disposed in the base of the screw cap retainer bore connecting conductively the outlet base bore to the outlet port.

Actuating the first actuating means positions the sealant piston head of the piston in an open valve position, providing an open fluid transfer path from inlet port, through the first internal fluid port, through the concentric fluid transfer channel disposed around the piston axis, through the fluid transfer bore, through the outlet base bore, through the second internal fluid port and through the outlet port. Actuating the second actuating means positions the second piston end face in a selected valve position, positioning the piston in a selected position, regulating the pressure of the fluid flow at a controlled pressure value.

Included in the objects of this invention are:

To provide an economical pressure regulator valve suitable for regulating the fluid flow pressure at the outlet port of the valve.

To provide a liquid flow pressure regulator valve capable of adjustably producing 10 to 80 psi outlet port pressure from a 120 psi inlet port flow pressure.

To provide a fluid flow pressure regulator valve whose pressure regulation springs are not immersed in the fluid flow stream.

To provide rigid plastic composition valve components which can withstand chemically corrosive fluid flow streams.

To provide a pressure regulator valve having a coaxial inlet port and outlet port.

To provide a simple O-ring sealing shoulder on a slidable piston, providing a simple fluid flow sealant.

Other objects and advantages of this invention are taught in the following description and claims.

BRIEF DESCRIPTION OF THE DRAWINGS

The description of this invention is to be read in conjunction with the following drawings:

FIG. 1 is an elevational, mid-sectional view of a pressure regulator valve of this invention, shown in a selected regulated valve position.

FIG. 2 is an elevational, partial perspective, and partial mid-sectional view of the pressure regulator valve of FIG. 1, shown in a pressure regulating position.

FIG. 3 is a fragmentary mid-sectional, elevational modification of the pressure regulator valve of this invention, modified by an adjustable spring actuator means for controlled outlet fluid pressure, show in a selected valve position.

FIG. 4 is a view of the total valve of FIG. 3 shown in a selected pressure regulating position.

FIG. 5 is a view of the separate annular washer component of FIGS. 1-4.

FIG. 6 is a detailed view of the O-ring sealing shoulder disposed on the slidable sealing piston.

DESCRIPTION OF THE PREFERRED EMBODIMENT OF THE INVENTION

Referring in detail to FIGS. 1, 2 and 5, the fluid pressure regulator valve combination 10 has a rigid plastic composition valve housing 11 having a coaxial 1—1 aligned opposed inlet port 13 and outlet port 14, and a hollow cylindrical interior having four stepped concentric cylindrical bores disposed above valve base 12. The concentric bores comprise a deep base bore 15, a fluid transfer bore 16 disposed above the deep base bore 15, an outlet base bore 17 disposed above the transfer bore 16, and a screw cap retainer bore 18 having internal screw threads 31 disposed above the outlet base bore 17. Each one of the stacked concentric bores has a successively larger selected bore diameter on serially proceeding from the deep base bore 15 to the screw cap retainer bore 18. A cylindrical sealing solid piston 19 has a first flat piston crown and face 20 and an opposed second flat piston end face 21. The second piston end has a larger diameter 27 than the crown face 20. The piston 19 has one diametrically concentric fluid transfer channel 22 disposed in and circumferentially around the piston cylindrical axis adjacent to the first piston crown end face 20, and the piston 19 has a circumferential shoulder 23 suitable for sealing fluid flow, disposed adjacent to the channel 22. Two sealing O-rings are disposed in O-ring sealing channels, one of the O-rings 26 separately concentrically disposed adjacent to the second flat piston end face 21 and the other O-ring 25 disposed in the circumferential shoulder channel 24 adjacent to the fluid transfer channel 22, providing slidable fluid sealants on the piston 19.

A cylindrical screw cap 28 has a shaped hollow dome 29 and external concentric screw threads 30 secured in the hollow cylindrical valve housing interior, the external screw threads 30 mating with the screw threads 31 of the screw cap retainer bore. An interior fluid distribution annular washer 32 is secured and seated between the base 33 of the outlet base bore 17, and a concentric annular washer recess 34 disposed in the interior face of the screw cap 28, adjacent to the cap screw threads 30. The annular washer 32 has multiple concentric radial apertures 35 extending normally from the annular washer symmetry axis 2—2, providing a connecting fluid flow path to a concentric tubular cap bore 36 disposed in the screw cap 28. A solid flat slidable sealant piston head 37 is diametrically sized to provide a close slidable linear alignment in the screw cap tubular bore 36, the flat sealant piston head 37 being coaxially secured by fastener 38 to the first flat crown end face 20 of the solid piston 19. The solid flat sealant piston head has an O-ring sealant 39, providing a fluid transfer seal between a lower fluid cavity 40 in the screw cap bore 36 and an upper cavity 41 in the screw cap bore 36.

A first gas actuating means 42 is secured in the screw cap inlet 43 adjacent to the solid flat piston head 37 and is disposed to cooperatively variably actuate the solid flat piston head 37. A second actuating means has a compression loaded metal spring 44 biased in an aperture 45 disposed at the second piston end face 21. One sealing O-ring 46 is disposed in an O-ring channel 47 concentrically disposed in the base of the outlet base bore 17 adjacent to the fluid transfer bore 16, providing a fluid transfer seal. One sealing O-ring 48 is disposed in an O-ring channel 49 concentrically disposed in the base of the screw cap retainer bore 18, providing a fluid transfer seal. A first internal fluid port 50 connects conductively the inlet port 13 to the fluid transfer bore 16. A second internal fluid port 51 is disposed in the base of the screw cap retainer bore 18 connecting conductively the outlet base bore 17 to the outlet port 14.

Actuating the first actuating means 42 positions the sealant piston head of the piston in an open valve position (FIG. 2), providing an open fluid transfer path from inlet port 13, through the first internal fluid port 50, through the concentric fluid transfer channel 22 disposed around the piston axis 1—1, through the fluid transfer bore 16, through the outlet base bore 17, through the second internal fluid port 51, and through the outlet port 14. Concurrently actuating the second actuating means positions the second piston end face in a selected valve position, positioning the piston in a selected position, regulating the pressure of the fluid flow at a controlled pressure value.

Referring to the modification of FIGS. 3 and 4 of the fluid pressure regulator valve 60, the valve 60 has a screw cap 61 with a relatively higher hollow shaped dome 62 than 28 disposed and secured on the identical valve housing 11. The screw cap 61 is mated to the internal screw threads 31 of the screw cap retainer bore 18. The solid piston head 63 has a centering crown elevation 64, and the head 63 is centered and adaptively secured to the first flat piston crown end face 20 by a set screw fastener 65. The crown elevation 64 is sized and adapted to center the coiled compression spring 66. Spring 66 is held in compression by the thrust washer 67, and the washer 67 is adjustably compressively loaded and unloaded by the thrust screw 68, which is screwed through the threaded opening 69. The thrust screw 68 is locked in position by the lock nut 70, and the manual adjusting handle 71 secured to screw 68. The compression load values of the compression metal spring 66 and compression metal spring 44 are adjusted to the required values needed to provide pressure regulation.

FIG. 6 illustrates in greater detail an important inventive advance in this simple regulator valve modification in which the circumferential sealant shoulder 23, and the like, has an O-ring sealant 25 and the like disposed in an O-ring circumferential channel 24 and the like. Sealant 25 is disposed against a first channel wall 80 whose diameter is a selected value 81 which is adapted to provide a flexible O-ring sealant 25 against the annular washer 32 adjacent to the washer base 82. Sealant 25 is disposed against an opposed second channel wall 83 whose diameter 27 is larger than channel wall 80 and provides a mechanical stop against washer base 82. Basically, an O-ring sealant is disposed and secured in an O-ring channel. One wall of the above channel is disposed adjacent to at least one fluid flow transfer channel and has a selected wall diameter adapted and sized to provide an O-ring sealant continuous contact pressure against a sealant surface of a fluid flow bore on actuating a means operating the solid piston.

The screw cap 28 has external screw threads 30, and the screw cap bore 18 has internal screw threads 31, but the threads on the components can be obviously reversed. The cap 28 can be equivalently designed to have internal threads and the screw cap bore 18 can be designed to seal with external screw threads.

The pressure regulator of FIGS. 3 and 4 of this invention typically have a spring pair 44 and 66, which have spring rates of 6 lb/in of compression and 110–120 lb/in of compression respectively. Other spring rated springs can be selected for specific applications. Typically the fluid flow through a typical spring loaded valve can be reduced from 100 psi to 20 psi, or 120 psi to 50 psi, or 90 psi to 30 psi. The valves can operate on either liquid or gas flows.

Normally the valves of this invention operate over a pressure range of up to 125 psi, but the components can be designed to withstand and operate at higher pressure values to 500 psi and the like. Typical compositions useful in component construction can be polypropylene, rigid polyvinyl chloride, polytetraflouroethylene, brass, aluminum, and the like, providing moderate cost raw materials and manufacturing costs.

Since the same basic valve housing 11 and the like can be utilized in fabricating the modular pressure regulator valves of this invention, the manufacture of an array of valve models is facilitated.

Many modifications in the pressure regulator valves can be made in the light of my teachings. It is understood that within the scope of the claims, the invention can be practiced otherwise than as described.

I claim:

1. A fluid pressure regulator valve combination comprising:
   - a rigid plastic composition valve housing having coaxial aligned opposed inlet port and outlet port, and a hollow cylindrical interior having four stepped concentric cylindrical bores, said concentric bores comprising a deep base bore, a fluid transfer bore disposed above said deep base bore, an outlet base bore disposed above said transfer bore, and a screw cap retainer bore having internal screw threads disposed above said outlet base bore, each one of the stacked aforesaid concentric bores having a successively larger selected bore diameter on serially proceeding from said deep base bore to said screw cap retainer bore;
   - a cylindrical sealing solid piston having a first flat piston crown end face and an opposed second flat piston end face, said second piston end having a larger diameter than said crown face, said piston having one diametrically concentric fluid transfer channel disposed in and circumferentially around the piston cylindrical axis adjacent to said first piston crown end face, said piston having a circumferential shoulder suitable for sealing fluid flow disposed adjacent to said channel;
   - two sealing O-rings disposed in O-ring sealing channels, each of said O-rings separately concentrically disposed adjacent said second flat piston end face and said circumferential shoulder adjacent to said fluid transfer channel, providing slidable fluid sealants on said piston;
   - a cylindrical screw cap having a shaped hollow dome and external concentric screw threads secured in said hollow cylindrical valve housing interior, said external screw threads mating with the screw threads of screw cap retainer bore;
   - an interior fluid distribution annular washer compressively secured and seated between the base of said outlet base bore and a concentric annular washer recess disposed in the interior face of said screw cap adjacent said cap screw threads, said annular washer having multiple concentric radial apertures extending normally from the annular washer symmetry axis, providing a connecting fluid flow path to a concentric tubular cap bore disposed in said screw cap;
   - a solid flat slidable sealant piston head diametrically sized to provide a close slidable linear alignment in said screw cap tubular bore, said flat sealant piston head coaxially secured by fastener to said first flat crown end face of said solid piston, said solid flat sealant piston head having an O-ring sealant, providing a fluid transfer seal between a lower fluid cavity in said screw cap bore and an upper cavity in said screw cap bore;
   - a first actuating means secured in said screw cap adjacent said solid flat piston head and disposed to cooperatively variably actuate said solid flat piston head;
   - a second actuating means having a compression loaded metal spring biased in an aperture disposed at said second piston end face;
   - one sealing O-ring disposed in an O-ring channel concentrically disposed in the base of said outlet base bore adjacent to said fluid transfer bore, providing a fluid transfer seal;
   - one sealing O-ring disposed in an O-ring channel concentrically disposed in the base of said screw cap retainer bore, providing a fluid transfer seal;
   - a first internal fluid port connecting conductively said inlet port to said fluid transfer bore; and,
   - a second internal fluid port disposed in said base of said screw cap retainer bore connecting conductively said outlet base bore to said outlet port;
   - whereby actuating said first actuating means positions said sealant piston head of said piston in an open valve position, providing an open fluid transfer path from inlet port, through said first internal fluid port, through said concentric fluid transfer channel disposed around said piston axis, through said fluid transfer bore, through said outlet base bore, through said second internal fluid port and through said outlet port,
   - and whereby actuating said second actuating means positions said second piston end face in a selected valve position, positioning said piston in a selected position, regulating the pressure of said fluid flow at a controlled pressure value.

2. In the valve combination set forth in claim 1, the further modification wherein
said first actuating means has an actuating body of compressed gas having a pressure value suitable for pressurizing said solid flat piston head.

3. In the valve combination set forth in claim 1, the further modification wherein
said first actuating means has a compression biased spring, and an adjustable compression screw disposed and secured through a mating screw aperture in said hollow dome of said screw cap, said compression screw adjustably bearing on a pressure washer and biasing said spring.

* * * * *